United States Patent
Dudar et al.

(10) Patent No.: US 10,493,993 B2
(45) Date of Patent: Dec. 3, 2019

(54) MITIGATION FOR DRIVING THROUGH HIGH WATER

(71) Applicant: Ford Global Technologies, LLC, Dearborn, MI (US)

(72) Inventors: Aed M. Dudar, Canton, MI (US); Dennis Seung-Man Yang, Canton, MI (US); Shahid Ahmed Siddiqui, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 155 days.

(21) Appl. No.: 15/700,014

(22) Filed: Sep. 8, 2017

(65) Prior Publication Data

US 2019/0077406 A1   Mar. 14, 2019

(51) Int. Cl.
| | |
|---|---|
| B60W 40/06 | (2012.01) |
| B60K 15/035 | (2006.01) |
| B60G 17/0165 | (2006.01) |
| B60K 28/10 | (2006.01) |
| B60W 30/18 | (2012.01) |
| B60W 50/00 | (2006.01) |

(52) U.S. Cl.
CPC ........... *B60W 40/06* (2013.01); *B60K 15/035* (2013.01); *B60G 17/0165* (2013.01); *B60K 28/10* (2013.01); *B60K 2015/0358* (2013.01); *B60K 2015/03561* (2013.01); *B60K 2015/03566* (2013.01); *B60W 30/18009* (2013.01); *B60W 50/0098* (2013.01); *B60W 2400/00* (2013.01); *B60W 2550/14* (2013.01); *B60Y 2200/42* (2013.01); *B60Y 2306/13* (2013.01)

(58) Field of Classification Search
None
See application file for complete search history.

(56) References Cited

U.S. PATENT DOCUMENTS

| | | | | |
|---|---|---|---|---|
| 2009/0159055 | A1* | 6/2009 | Ohhira | B60K 15/03504 123/519 |
| 2009/0188809 | A1* | 7/2009 | Noel | C25B 1/02 205/335 |
| 2010/0112387 | A1* | 5/2010 | Nagasawa | B60L 3/00 429/413 |
| 2010/0224172 | A1* | 9/2010 | Kusa | B60K 15/03504 123/520 |

(Continued)

FOREIGN PATENT DOCUMENTS

| | | |
|---|---|---|
| CN | 102795109 A * | 11/2012 |
| CN | 102923071 A | 2/2013 |

(Continued)

OTHER PUBLICATIONS

CN102795109A English translation.*

*Primary Examiner* — Rami Khatib
(74) *Attorney, Agent, or Firm* — Geoffrey Brumbaugh; McCoy Russell LLP (57) ABSTRACT

Methods and systems are provided for estimating a level of water in real time for a vehicle and using the said estimation to perform one or more vehicle control strategies. In one example, a method may include adjusting a valve in a fuel system of the vehicle responsive to a level of water through which the vehicle is passing. In this way, water inhalation into the vehicle fuel system may be avoided.

20 Claims, 5 Drawing Sheets

(56) References Cited

U.S. PATENT DOCUMENTS

| | | | |
|---|---|---|---|
| 2010/0297514 A1* | 11/2010 | Jufuku | B60K 13/04 |
| | | | 429/428 |
| 2013/0336090 A1 | 12/2013 | Tran et al. | |
| 2014/0166596 A1* | 6/2014 | Anderson | F02M 37/24 |
| | | | 210/799 |
| 2015/0046032 A1 | 2/2015 | Clarke et al. | |
| 2016/0207419 A1* | 7/2016 | Ohashi | B60K 13/02 |

FOREIGN PATENT DOCUMENTS

| | | |
|---|---|---|
| CN | 103112422 A | 5/2013 |
| WO | 03002378 A1 | 1/2003 |
| WO | 2012080438 A1 | 6/2012 |
| WO | 2012123554 A1 | 9/2012 |

\* cited by examiner

MITIGATION FOR DRIVING THROUGH HIGH WATER

FIELD

The present description relates generally to methods and systems to estimate water depth for a vehicle driving through water and using the estimation to perform one or more vehicle control strategies.

BACKGROUND/SUMMARY

Land-based vehicles may often travel through water. Some vehicles, such as off-road vehicles, may be designed to travel through a specified depth of water, referred to as a maximum wading depth, and in preparation may comprise suitably sealed closures to prevent water damage to vehicle compartments and vehicle electronics. Encountering a level of water beyond the maximum wading depth may pose a risk of engine damage. In situations of a vehicle wading, a driver of the vehicle may typically be uninformed of the precise depth of water which the vehicle is about to enter or is already traveling in.

As such, various attempts have been made to determine wading depth for vehicles. One example approach shown by Clarke et al. in U.S. 2015/0046032 A1 discloses a vehicle system that determines a possibility of the vehicle entering into a wading situation. By employing remote ranging sensors to detect the presence and the depth of water in which the vehicle is traveling, the system may take precautionary measures so as to prepare the vehicle for possible wading. Therein, vehicle operations may be adjusted to activate an internal combustion engine from an electric only driving mode, suspend a stop-start fuel saving mode, and/or actuate a ride-height adjustment.

However, the inventors herein have recognized potential issues with such systems. As one example, off road vehicles designed to travel through a finite wading depth may encounter higher than maximum wading depth levels of water, such as when driving through a flooded area or during flash floods, or when backing up into a body of water such as during a boat launch procedure. Further, even if precautionary measures such as those stated above were adopted, water may enter into the evaporative emission control system in vehicles driven through high water. For example, water may enter the fuel system and eventually the engine via a vent port during a purge operation. During purging mode of a vehicle, a fuel vapor canister packed with adsorbent may allow the adsorbed vapors to be purged by fresh air, taken in via the canister vent port and a vent line inlet into the canister from where a fuel-air mixture may be purged into the engine intake manifold for use as fuel. In the event of entry of water into the evaporative emission control system, if water were permitted to make contact with the adsorbent material, the adsorbent would no longer function to adsorb fuel vapors. Additionally, water may be sucked via a canister purge valve into the combustion cylinders due to the vacuum existent in the intake manifold causing a hydrolock situation.

In one example, the issues described above may be addressed by a method for a vehicle comprising adjusting a valve in a fuel system of a vehicle responsive to a level of water through which the vehicle is passing. The valve in the fuel system being adjusted may be a canister purge valve or a canister vent valve. In this way, the method may shut off fuel vapor purging when a vehicle is traveling in high water to prevent the sucking of water into the fuel vapor canister and into the engine intake manifold, thereby preventing degradation to the fuel vapor canister and preventing engine hydrolock.

As one example, a proximity sensor may be employed to detect a depth of water during forward driving. The proximity sensor may be used for estimating a distance to objects when the vehicle is in reverse gear and the sensor is horizontally-facing, such as a backup sensor. The sensor may be repurposed and adjusted to a vertically-facing position to detect a distance to a nearest surface during forward drive of the vehicle. In the event of the vehicle traveling through high water, the proximity sensor may estimate a distance to water and calculate a water level (e.g. depth/height of water above ground) through which the vehicle is traveling. The water level, if determined to be above a first threshold, may be high enough such that water may be introduced into the evaporative emission control system and therefore as a precaution, purge operations may be disabled by closing of a canister purge valve (CPV) and/or the canister vent valve (CVV). Further, a determination of water level above a second threshold may indicate the water level is high enough to be introduced into the engine air intake. Therefore, as a precautionary measure the engine may be strategically shut-off to prevent hydrolock.

Thus, by suspending purge operation when a vehicle is in water exceeding the first water level threshold, and by further shutting off the engine when the water level exceeds a second threshold, the risk of water inhalation into the evaporative emission control system and the engine air intake may be mitigated. Additionally, using the proximity sensor as a backup sensor during reverse drive and by repurposing the existent proximity sensor to face vertically during forward drive to detect distance to a nearest ground surface in real time eliminates the need for additional sensors and/or equipment. The proximity sensor when vertically-facing may provide a reliable estimation of proximity to the nearest surface (e.g. distance from the sensor to water for a vehicle driving in water), responsive to which fuel vapor purging may be disabled. In this way, the vehicle components, specifically the evaporative emission control system and the engine air intake system, may be prepared and protected from water degradation and maintenance costs may be pre-empted.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
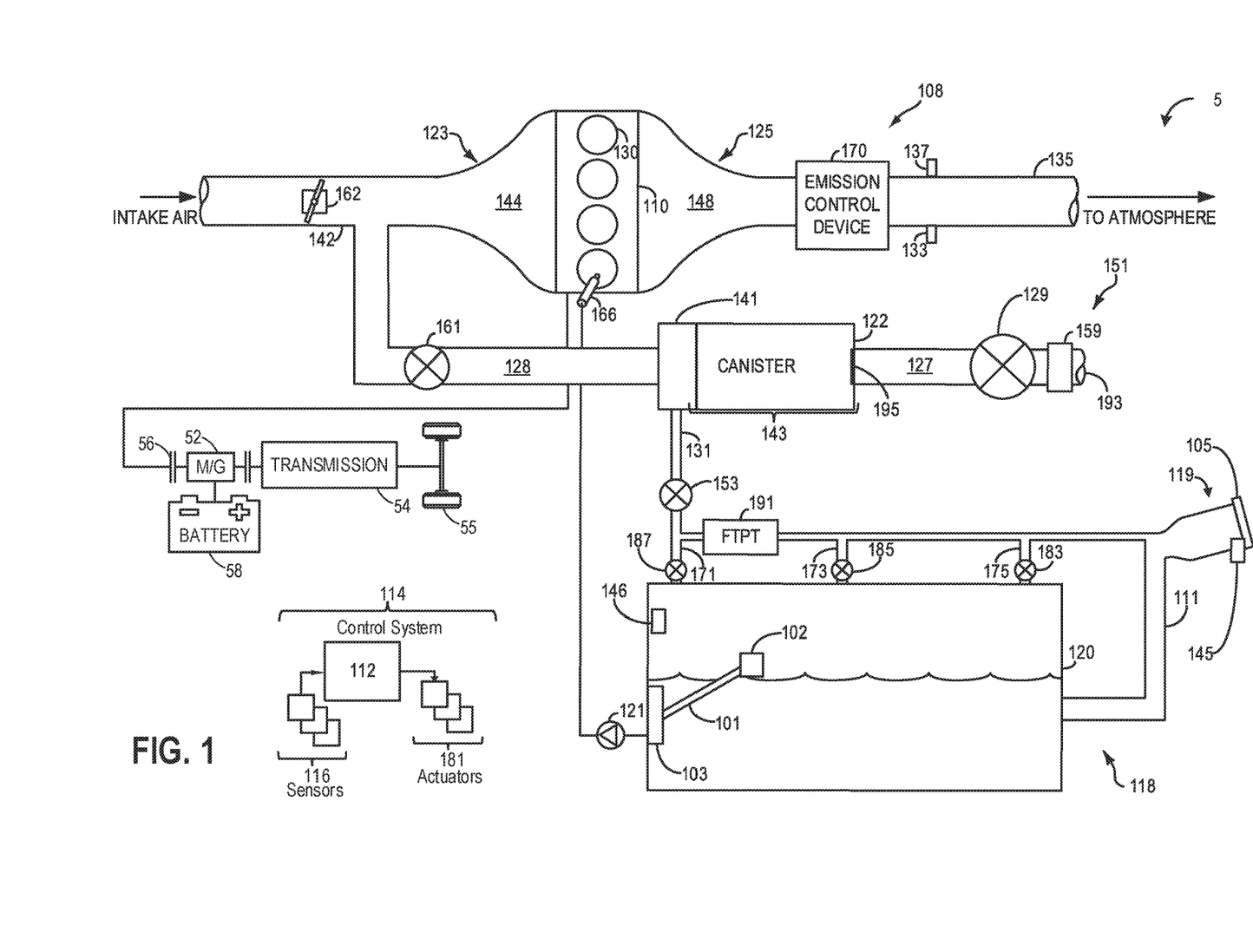
FIG. 1 shows a schematic depiction of an internal combustion engine of a hybrid vehicle and an associated evaporative emission control system.

The following description relates to systems and methods for operating an engine included in a vehicle, such as a hybrid electric vehicle illustrated in FIG. 1. The vehicle shown in FIG. 1 may include a fuel system and an evaporative emissions control system. The vehicle may further include a proximity sensor, such as the sensor of FIGS. 2A and 2B, located on the body of the vehicle. The proximity sensor may function as a remote sensor and determine a distance to nearby surfaces. Typically, the proximity sensor may be horizontally-facing and during reverse driving of the vehicle, may be configured to estimate proximity horizontally when approaching nearby objects, while during forward driving of the vehicle the proximity sensor may be vertically-facing and may estimate proximity vertically to the nearest surface. For example when the vehicle of FIG. 1 is traveling on ground, the proximity sensor may detect proximity to ground surface, and when the vehicle is traveling through water, the proximity sensor may detect the proximity to the water surface. During conditions when the vehicle may be driven through water, a controller of the vehicle may be configured to obtain proximity sensor output data and determine a water level based on the sensor output. The controller may then compare the determined water level to a first water level threshold and a second water level threshold as shown in FIG. 3. The water level thresholds may be indicative of when the estimated water levels may be high enough to be introduced into the engine system of FIG. 1, either through the fuel vapor canister vent line or the engine air intake. The controller may be further configured to perform a control routine, such as the example routine illustrated in FIG. 4, for controlling one or more vehicle operations in response to estimated water levels, as depicted in FIG. 5. If the estimated water level is above the first threshold but does not surpass the second threshold, there may be a possibility of water being introduced into the evaporative emissions control system and therefore as a precaution, the controller may disable purge operations of the fuel vapor canister. Additionally, in response to the estimated water level being higher than the second threshold, the controller may shut-off the engine to prevent water from being introduced into the engine intake.

Turning now to the figures, FIG. 1 illustrates an example internal combustion engine of a hybrid vehicle 5, with a fuel system 118 and an evaporative emission control system 151. In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 110 and an electric machine 52. Electric machine 52 may be a motor or a motor/generator. Crankshaft (not shown) of engine 110 and electric machine 52 are connected via a transmission 54 to vehicle wheels 55 when one or more clutches 56 are engaged. In the depicted example, a first clutch 56 is provided between the crankshaft and electric machine 52, and a second clutch 56 is provided between electric machine 52 and transmission 54. Controller 112 may send a signal to an actuator of each clutch 56 to engage or disengage the clutch, so as to connect or disconnect the crankshaft from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

The engine system 108 may include an engine 110 having a plurality of cylinders 130. The engine 110 includes an engine intake 123 and an engine exhaust 125. The engine intake 123 includes a throttle 162 fluidly coupled to the engine intake manifold 144 via an intake passage 142. The engine exhaust 125 includes an exhaust manifold 148 leading to an exhaust passage 135 that routes exhaust gas to the atmosphere. The engine exhaust 125 may include one or more emission control devices 170, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 118 may include a fuel tank 120 coupled to a fuel pump system 121. The fuel pump system 121 may include one or more pumps for pressurizing fuel delivered to the injectors of engine 110, such as the example injector 166 shown. While only a single injector 166 is shown, additional injectors may be provided for each cylinder. It will be appreciated that fuel system 118 may be a return-less fuel system, a return fuel system, or various other types of fuel system. Fuel tank 120 may include a temperature sensor 146 disposed therein.

A fuel level sensor 103 may be included in fuel tank 120 to determine an amount of fuel in the fuel tank. For example, fuel level sensor 103 may include an arm 101 coupled to a float 102. In this example, the position of the float 102 on the top surface of the fuel volume may be used to determine a fuel level in the fuel tank. Emission control system 151 may include a fuel vapor canister 122 which may be used to capture and store fuel vapors. For example, vapors generated in fuel system 118 may be routed to the evaporative emissions control system 151 which includes the fuel vapor canister 122 via vapor recovery line 131, before being purged to the engine intake 123. Fuel vapor canister 122 may include a buffer or load port 141 to which fuel vapor recovery line 131 is coupled. In the depicted example, fuel system 118 includes a single canister. However, in alternate examples, one or more canisters may be provided.

Vapor recovery line 131 may be coupled to fuel tank 120 via one or more conduits and may include one or more valves for isolating the fuel tank during certain conditions. For example, vapor recovery line 131 may be coupled to fuel tank 120 via one or more or a combination of conduits 171, 173, and 175. Further, in some examples, one or more fuel tank isolation valves may be included in recovery line 131 or in conduits 171, 173, or 175. Among other functions, the fuel tank isolation valves may allow the fuel vapor canister of the emissions control system to be maintained at a low pressure or vacuum without increasing the fuel evaporation rate from the tank (which would otherwise occur if the fuel tank pressure were lowered). For example, conduit 171 may include a grade vent valve (GVV) 187, conduit 173 may include a fill limit venting valve (FLVV) 185, conduit 175 may include a grade vent valve (GVV) 183, and/or conduit 131 may include an isolation valve 153. Further, in some examples, recovery line 131 may be coupled to a fuel filler system 119. In some examples, fuel filler system 119 may include a fuel cap 105 for sealing off the fuel filler system from the atmosphere. Fuel filler system 119 is coupled to fuel tank 120 via a fuel filler pipe or neck 111. Further, a fuel cap locking mechanism 145 may be coupled to fuel cap 105. The fuel cap locking mechanism may be configured to automatically lock the fuel cap in a closed position so that the fuel cap cannot be opened. For example, the fuel cap 105 may remain locked via locking mechanism 145 while pressure or vacuum in the fuel tank is greater than a threshold. In response to a refuel request, e.g. a vehicle operator initiated request, the fuel tank may be depressurized and the fuel cap unlocked after the pressure or vacuum in the fuel tank falls below the threshold. Fuel cap locking mechanism 145 may be a latch or clutch, which, when engaged, prevents removal of the fuel cap. The latch or clutch may be electrically locked, for example, by a solenoid, or may be mechanically locked, for example, by a pressure diaphragm.

A fuel tank pressure transducer (FTPT) 191, or fuel tank pressure sensor, may be included between the fuel tank 120 and fuel vapor canister 122, to provide an estimate of a fuel tank pressure. The fuel tank pressure transducer may alternately be located in vapor recovery line 131, purge line 128, vent line 127, or other location within emission control system 151 without affecting its engine-off leak detection ability. As another example, one or more fuel tank pressure sensors may be located within fuel tank 120.

Fuel vapor canister 122 may be filled with an appropriate adsorbent to temporarily trap fuel vapors (including vaporized hydrocarbons) during fuel tank refilling operations and "running loss" (that is, fuel vaporized during vehicle operation). In one example, the adsorbent used is activated charcoal. Emissions control system 151 may further include a canister ventilation path or vent line 127 which may route gases out of the canister 122, via a canister vent port 195 to the atmosphere via a vent line inlet 193 when storing, or trapping, fuel vapors from fuel system 118.

Vent line inlet 193 may also allow fresh air to be drawn into vent line 127 and into canister 122 via a canister vent port 195, when purging stored fuel vapors from fuel system 118 to engine intake 123 via purge line 128 and canister purge valve (CPV) 161. For example, purge valve 161 may be normally closed but may be opened during certain conditions so that vacuum from engine intake 144 is provided to the fuel vapor canister for purging. In some examples, vent line 127 may include an air filter 159 disposed therein upstream of a canister 122.

In some examples, vent line inlet 193 may allow the flow of air and vapors between canister 122 and the atmosphere that may be further regulated by a canister vent valve (CVV) 129 coupled within vent line 127 and a canister vent port 195 fluidly coupled to CVV 129 and vent line 127, present on the canister housing where the vent line is coupled to the canister. When included, the canister vent valve 129 may be a normally open valve, so that fuel tank isolation valve 153 (FTIV) may control venting of fuel tank 120 to the atmosphere. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air via the vent line inlet to strip the fuel vapors stored in the canister. In some examples, CVV 129 may be a solenoid valve wherein opening or closing of the valve is performed via actuation of a canister vent solenoid. In particular, the canister vent valve may be closed upon actuation of the canister vent solenoid. In some examples, CVV 129 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed is reduced. In particular, the CVV may be closed while the vehicle is off, thus maintaining battery power while maintaining the fuel emissions control system sealed from atmosphere. In addition, FTIV 153 may be a normally closed valve, that when opened, allows for the venting of fuel vapors from fuel tank 120 to fuel vapor canister 122. Fuel vapors may then be vented to atmosphere, or purged to engine intake 123 via canister purge valve 161.

Fuel system 118 may be operated by controller 112 in a plurality of modes by selective adjustment of the various valves and solenoids. For example, the fuel system may be operated in a fuel vapor storage mode (e.g., during a fuel tank refueling operation and with the engine not combusting air and fuel), wherein the controller 112 may open isolation valve 153 while closing canister purge valve 161 to direct refueling vapors into canister 122 while preventing fuel vapors from being directed into the intake manifold.

As another example, the fuel system may be operated in a refueling mode (e.g., when fuel tank refueling is requested by a vehicle operator), wherein the controller 112 may open isolation valve 153, while maintaining canister purge valve 161 closed, to depressurize the fuel tank before allowing enabling fuel to be added therein. As such, isolation valve 153 may be kept open during the refueling operation to allow refueling vapors to be stored in the canister. After refueling is completed, the isolation valve may be closed. Further, if misfueling is detected (e.g., when the diesel fuel is dispensed into gasoline fuel tank), the controller 112 may be configured to actively close isolation valve 153. By sealing the fuel tank responsive to the indication of misfueling, further addition of the incorrect fuel into the fuel tank is pre-empted.

As yet another example, the fuel system may be operated in a canister purging mode (e.g., after an emission control device light-off temperature has been attained and with the engine combusting air and fuel), wherein the controller 112 may open canister purge valve 161 while closing isolation valve 153. Herein, the vacuum generated by the intake manifold of the operating engine may be used to draw fresh air through vent line 127 and through fuel vapor canister 122 to purge the stored fuel vapors into intake manifold 144. In this mode, the purged fuel vapors from the canister are combusted in the engine. The purging may be continued until the stored fuel vapor amount in the canister is below a threshold.

Controller 112 may comprise a portion of a control system 114. Control system 114 is shown receiving information from a plurality of sensors 116 (various examples of which are described herein) and sending control signals to a plurality of actuators 181 (various examples of which are described herein). As one example, sensors 116 may include exhaust gas sensor 137 located upstream of the emission control device 170, temperature sensor 133, pressure sensor 191, and canister temperature sensor 143. Other sensors such as pressure, temperature, air/fuel ratio, and composition sensors may be coupled to various locations in the vehicle system 5. As another example, the actuators may include throttle 162, fuel tank isolation valve 153, canister purge valve 161, and canister vent valve 129. The control system 114 may include a controller 112. The controller may receive input data from the various sensors, process the input data, and trigger the actuators in response to the processed input data based on instruction or code programmed therein corresponding to one or more routines. An example control routine is described herein with regard to FIG. 4.

Undesired evaporative emissions detection routines may be intermittently performed by controller 112 on fuel system 118 and/or evaporative emissions system 151 to confirm that undesired evaporative emissions are not present in the fuel system and/or evaporative emissions system. As such, evaporative emissions detection routines may be performed while the engine is off (engine-off test) using engine-off natural vacuum (EONV) generated due to a change in temperature and pressure at the fuel tank following engine shutdown and/or with vacuum supplemented from a vacuum pump. Alternatively, evaporative emissions detection routines may be performed while the engine is running by operating a vacuum pump and/or using engine intake manifold vacuum.

Figure 2A:
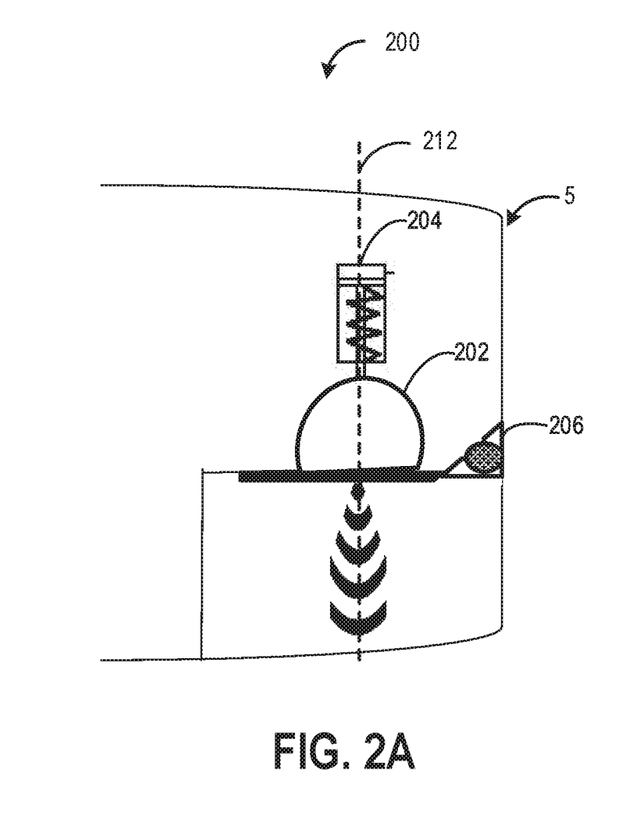
FIGS. 2A-2B show detailed side views of different positions of the proximity sensor.
Figure 2B:
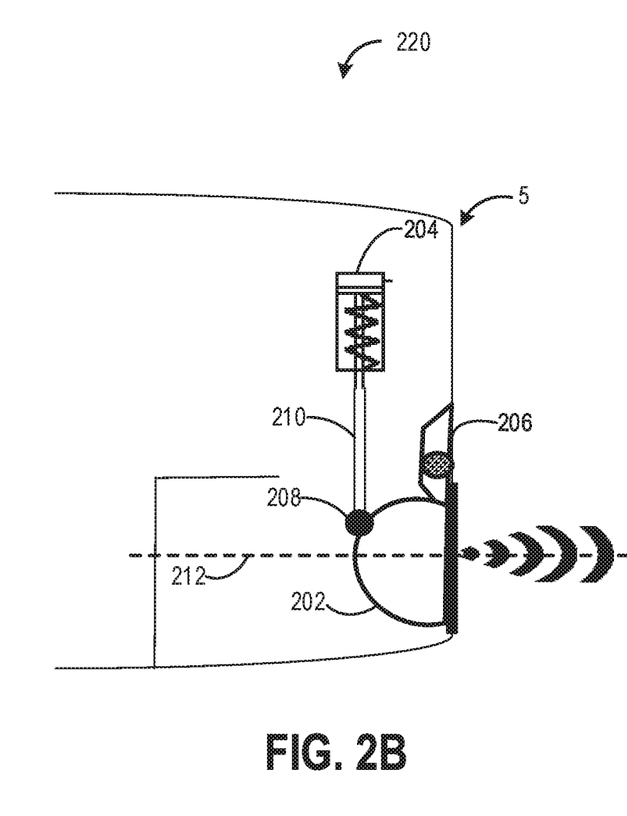
Figure 3:
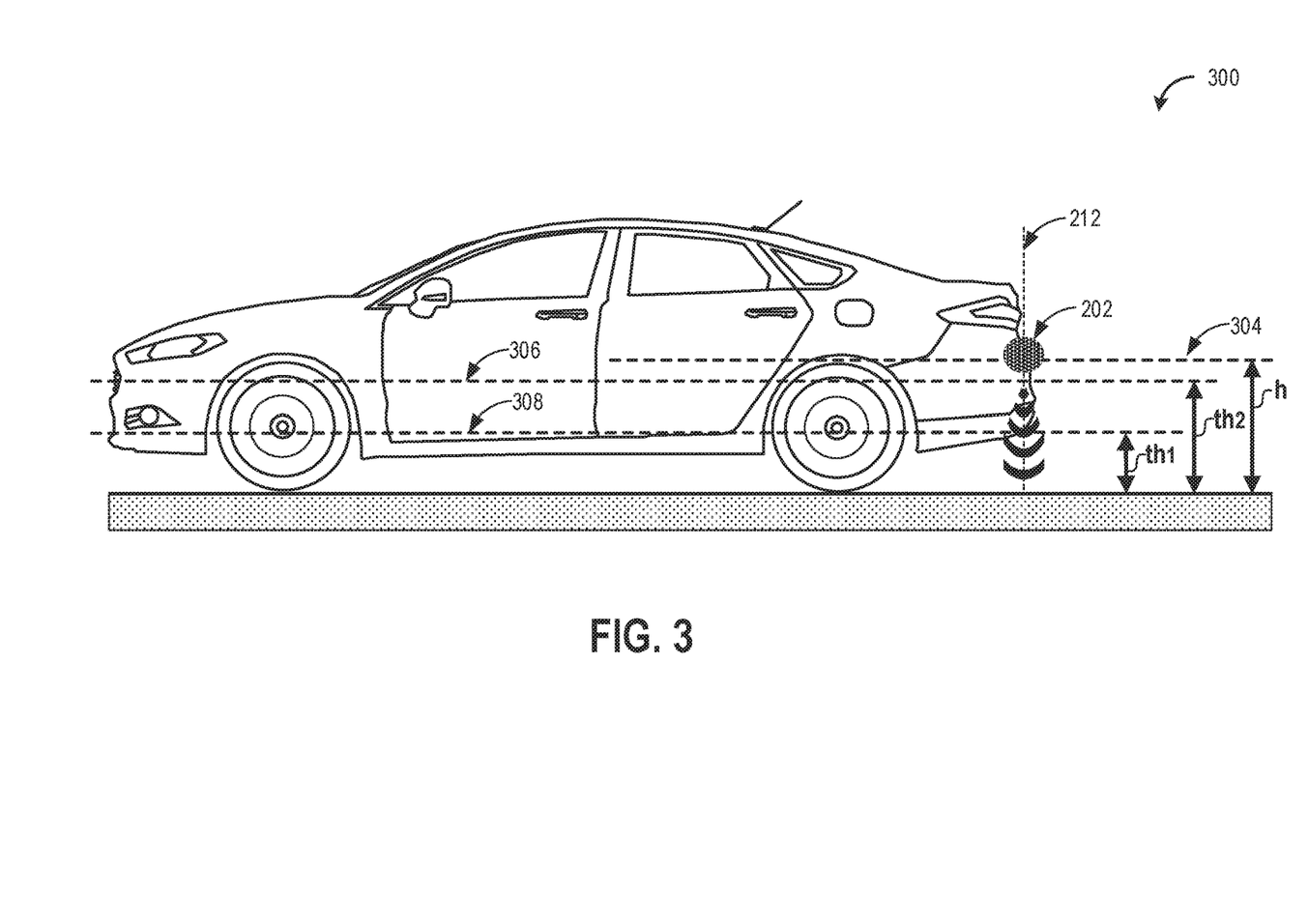
FIG. 3 is a schematic view of a vehicle with the proximity sensor of FIGS. 2A and 2B positioned to detect various detection thresholds.

FIGS. 2A-2B schematically shows detailed side views 200, 220 of a proximity sensor 202 coupled to vehicle 5. Proximity sensor 202 may be positioned in the rear of the vehicle body such as on the rear bumper, underneath the rear bumper or optionally on rear license plates for example. In another example, one or more proximity sensor(s) may be positioned at the rear and/or optionally to the front of vehicle 5. Proximity sensor 202 may be optionally located on one or more of a front sub frame, bumper beam, engine bay bulkhead, suspension knuckle, or other similar component. In one example, only one proximity sensor may be positioned on the vehicle, while in other examples, more than one sensor may be provided that may be variously positioned and arranged.

Proximity sensor 202 may be an ultrasonic sensor that may be capable of remotely sensing an obstacle or a surface in the vehicle's proximity, in one example. In other examples, electromagnetic sensors, optical sensors, capacitive sensors or other proximity determining sensors may be used. In one example, the proximity sensor may function as a parking distance control (PDC) sensor or a backup sensor to alert a driver to obstacles during parking. When functioning as an ultrasonic backup sensor, proximity sensor 202 may be a remote sensing device (e.g. non-contact sensor) that may determine the presence and the proximity of obstacles relative to the vehicle. In examples, where the vehicle is treading in water, the proximity sensor may detect the presence of water and the proximity to water prior to the vehicle being driven in water, such as when a vehicle is driving into a flooded area. These remote sensors may be acoustic transducers that transmit a pulsed ultrasound beam that may be detected as a signal upon reflection from the object (e.g. an obstacle in the vehicle's path or a surface of water through which the vehicle may be passing), and may be further used to calculate proximity.

FIGS. 2A-2B shows the proximity sensor 202 positioned in the rear of the vehicle body such as on the rear bumper of vehicle 5. The proximity sensor may be mounted with a spring (not shown) wherein the spring may be coupled to an actuator of proximity sensor 202. The actuator of sensor 202 may comprise an electromechanical device such as solenoid 204 including a plunger 210. The electrical energy used to actuate solenoid 204 may be translated into a mechanical movement of the plunger 210. The solenoid 204 with plunger 210 may be installed on top of the curved back surface of sensor 202 with a ball point contact 208. Proximity sensor 202 may be configured to be adjusted into two positions such as a horizontally-facing position and a vertically-facing position. The vertically-facing position shown in FIG. 2A may be a default position of the proximity sensor. In this position, the controller of the vehicle may de-energize the solenoid 204, such that plunger 210 may be in a retracted state with torsional spring hinge 212 relaxed, as depicted in FIG. 2A. When the proximity sensor is vertically-facing, it may estimate proximity to the nearest vertical (e.g., ground) surface, e.g. a vertical distance or height from the sensor to the nearest surface. In one example, the nearest surface may be the ground on which the vehicle is being driven and in another example when the vehicle is in water, the nearest surface may be the surface of water.

Proximity sensor 202 positioned in the rear of the vehicle and may sense proximity in two sensing directions perpendicular to each other, such as a vertical direction when the sensor is vertically-facing, measuring proximity to a nearby ground surface and a horizontal direction when the sensor is horizontally-facing, measuring proximity to a nearby object. In this example, sensor 202 may include a sensing axis 212, wherein the sensing axis may be an axis that runs through the sensor and is parallel to a direction in which the sensor measures proximity (e.g., the sensing axis is parallel to a radiating sound axis of the sensor, which may represent a central path/directionality of the sound waves radiated from the sensor). The sensing axis 212 may have an orientation that is perpendicular to a horizontal reference plane, such as the ground on which the vehicle sits/drives, when the sensor is in a vertically-facing default position as shown in FIG. 2A. The sensing axis 212 may be oriented parallel to the horizontal reference plane (e.g. ground) when sensor 202 is actuated to a horizontally-facing position, as seen in FIG. 2B. Proximity sensor 202 may be actuated into a horizontally-facing position as depicted in FIG. 2B responsive to a command from the controller of vehicle 5, under conditions such as those described in detail below. To adjust the position of sensor 202 from vertically-facing to horizontally-facing, the controller may send a signal to actuate the solenoid. When energized, solenoid 204 may cause plunger 210 to move away from the solenoid and apply a downward force on the ball point contact 208. In turn, the plunger may force the ball point contact 208 to rotate the sensor, thereby adjusting sensor 202 into a horizontally-facing position, with the torsional spring hinge 212 deflected (e.g. subjected to torque). When horizontally-facing, proximity sensor 202 may continue to function as a remote sensor, albeit horizontally to estimate a proximal distance to objects, such as a parking distance control (PDC) sensor or a backup sensor.

During conditions when a vehicle is in forward gear or any gear other than reverse, the sensor may be in the vertically-facing position as shown in FIG. 2A, which may be the default position for the sensor. In this position, proximity sensor 202 may function as a remote sensor to estimate proximity to the nearest surface. During typical driving conditions, the nearest surface may be the ground on which the vehicle is travelling. In the event of the vehicle driving through high water or encountering water while driving, the proximity sensor may estimate a distance to the water (for example, water being the nearest surface). In other words, proximity sensor 202 may sense the distance from a height at which the sensor is mounted to the water surface. The controller of vehicle 5 may have the sensor's height information stored in the memory. As one example, the height of the sensor above the ground may be stored in the memory of control system 114, at the time of manufacture.

During engine operation, the height of the sensor from the ground surface may change responsive to a change in tire pressure or a change in passenger load weight for example. In such an event, the controller may acquire distance output from the proximity sensor 202 and accordingly adjust and update the height of the sensor above ground. In the event of the vehicle driving through water, the proximity sensor may estimate a distance to water and output the data to the controller. The controller may then be able to estimate the height of water based on a difference in the distance output from sensor 202, from when the vehicle is traveling on dry ground compared to when the vehicle is being driven in water. Furthermore, the controller may include height information for other engine components relative to the proximity sensor's position on the vehicle. For example, the height of the engine air intake system and the evaporative emission control system above ground relative to the height of the proximity sensor may be stored in the memory of the controller. Thus, the controller may be able to not only estimate a distance from the proximity sensor to water, but also may additionally be able to estimate the proximity of other engine components to water, e.g., a distance from the engine air intake to water and a distance of the evaporative emission system to water.

Alternatively, when the vehicle is shifted into reverse driving mode, proximity sensor 202 may be actuated to a horizontally-facing position as shown in FIG. 2B. Upon sensing that the vehicle transmission is switched to the reverse driving mode, the controller of the vehicle may actuate the solenoid. The reverse driving mode of the vehicle may be determined from a selected drive gear of the vehicle or other mechanisms. When activated, solenoid 204 may use plunger 210 to apply a mechanical force in a downward direction, such that the plunger may push down on the ball point contact 208, thereby rotating and adjusting proximity sensor 202 into a horizontally-facing position, with the torsional spring hinge 212 deflected (e.g. subjected to torque). In this position, proximity sensor 202 may perform the same function of measuring distance to objects remotely. Since the proximity sensor in a horizontally-facing position may measure distances to objects or obstacles in the vehicle's drive path, the sensor may be a parking distance control (PDC) sensor or a backup sensor, pointing outward from the rear of the vehicle as seen in FIG. 2B. The sensor may further be configured to output distance measurements to the controller, wherein the controller may in one example, evaluate the measured proximity to an obstacle against a threshold range and provide an alert to the vehicle operator in one example. In another example, an on-board assessment of the presence and the distance to the obstacle may be provided to the operator of the vehicle, such as the vehicle may be equipped with a camera in direct connection with the proximity sensor.

In this way, the vehicle may be adapted to use an existent backup sensor for determining a distance to water when the vehicle is driven in high water. In one example, the proximity sensor may be actuated (e.g., horizontally) to function as a PDC sensor when a reverse gear is selected and may be de-actuated as soon as any other gear of the drive system is selected. In another example, the proximity sensor may be activated by a wading sensor (e.g. contact sensor) which may detect the presence of water (when immersed) at a low level with respect to the vehicle. Optionally, the wading sensor may be positioned below water-intaking vehicle components, such as the evaporative emission control system, and may automatically disable purge independently of the proximity sensor. In another example, the wading sensor may be sensitive enough to detect the presence of small amounts of water when in contact, such as during a rain event or during a vehicle driving through a puddle of water. Herein, when activated on contact with water, output of the wading sensor may be used by the controller to activate the proximity sensor in order to determine the distance to the nearest surface. The controller may then obtain distance measurements from the proximity sensor and determine if the vehicle is in high water. In another example, when the vehicle is in forward drive, the proximity sensor may be adjusted from a horizontally-facing PDC sensor position to a vertically-facing proximity sensor position, upon detection of a rain event. In some examples, the vertically-facing proximity sensor may be deactivated by the controller when the vehicle reaches a pre-determined speed (e.g. high speeds).

The proximity sensor may be present in the default position and face vertically as shown in FIG. 2A during conditions described above. In this position, proximity sensor 202 may estimate proximity to the nearest surface as described below with reference to FIG. 3. Referring now to FIG. 3, a schematic view of a vehicle with the rear proximity sensor of FIG. 2A positioned to detect distance to the nearest surface is shown. Proximity sensor 202 may be positioned in the rear of the vehicle along a central longitudinal axis of the vehicle as shown by line 304 in FIG. 3. The central longitudinal axis may be parallel to the horizontal reference plane such as the ground on which the vehicle sits/drives. The position of proximity sensor 202 may be at a vertical height 'h' on the vehicle body, wherein 'h' may correspond to a distance/height of the sensor above the horizontal reference plane (e.g. ground surface). The proximity sensor may also include sensing axis 212, wherein the sensing axis may be perpendicularly oriented to the horizontal reference plane, such as the ground, when the sensor is vertically-facing as shown in FIG. 3. Sensing axis 212 may also be perpendicularly oriented to one or more water level thresholds, described below. The sensor may be communicatively coupled to a controller, such as control system 114, and may be configured to output distance information to the controller.

As mentioned before, for a vehicle driving in high water, water may enter the evaporative emission control system via a vent line inlet 193 and into the fuel vapor canister via canister vent port 195. Herein, the fuel vapor canister packed with adsorbent may function to purge the adsorbed vapors by fresh air taken in through the vent line inlet by opening the canister vent valve 129. Therefore, in order to estimate a level of water relative to the position of the vent line inlet, the controller may include position information (e.g. vertical height/distance from ground surface) for the vent line inlet 193. The height/position of the vent line inlet on the vehicle is depicted by line 308 in FIG. 3 may be measured relative to the height/position of the proximity sensor and further stored in the memory of the controller. Line 308 may additionally represent a first water level threshold 'th1' which when exceeded, may permit water to enter into the evaporative emission control system via the vent line inlet and into the canister via the canister vent port, potentially degrading the fuel vapor canister.

Water may also enter into the internal combustion engine via the engine air intake system. Therefore, during conditions of driving in high water, in order to estimate water depth relative to the position of the engine air intake, the controller may further include position information (e.g. vertical height/distance from ground surface) for the vehicle air intake system. The height of the engine air intake depicted by line 306 in FIG. 3 may be measured relative to the height/position of the proximity sensor and stored in the memory of the controller. Line 306 may further represent a water level threshold 'th2' which when exceeded, may allow the entry of water into the engine air intake causing damage to engine components. Optionally, the position of the engine air intake (at a vertical height depicted by line 306) and the position of the vent line inlet (at a vertical height depicted by line 308) relative to ground surface may also be processed and stored in the memory of the controller of vehicle 5.

As the vehicle is traveling forward, controller 112 may predict the presence of high water ahead by inferring a rain event from one or more on-board rain sensors and/or from a remote weather service device, a GPS system, from vehicle to vehicle communication, and/or a personal weather station, for example. In one example, during forward drive of the vehicle and upon detection of a rain event, the proximity sensor may be in a vertically-facing position by default, functioning continuously as a remote sensor and relaying real time distance to the ground surface as an output to the controller. In another example, the vehicle in reverse gear with an actuated horizontally-facing proximity sensor may be gear-shifted into another gear. In such an event, the controller may automatically de-actuate the proximity sensor to the default position to face vertically. In another example, the proximity sensor may be activated by the presence of water sensed by a wading sensor (e.g. contact sensor, when immersed) placed at a low level with respect to the vehicle.

In one embodiment, during forward drive the vehicle may enter into a body of water and vertically-facing proximity sensor 202 may perform a distance measurement to the water, as the water being the nearest detectable surface (h*), and may output this information to the controller of vehicle 5. The position and height of the proximity sensor on the vehicle may be known to the controller. The controller may use the distance output obtained from the proximity sensor to compute an estimated height of water, based on the difference between the output of the sensor when driving on dry ground as compared to when driving in water (e.g. depth of water=[h−h*]). The controller may then compare the computed water depth against one or more thresholds to assess if the depth of water through which the vehicle is traveling may pose a problem to the vehicle components. Specifically, the controller may first compare the computed water depth to a first threshold 'th1', the threshold representing a height of the vent line inlet of the evaporative emissions control system above ground. If the computed water depth is found to be equal to or higher than 'th1', the controller may conclude that depth of water through which the vehicle is traveling is at or higher than the position of the vent line inlet, and that water may move into the evaporative emission control system via the open vent line inlet, and further into the canister via the canister vent port. The controller may then accordingly control specific vehicle operations, described in detail in FIG. 4.

The controller may next compare the computed water depth to a second threshold 'th2', the threshold representing a height of the engine air intake above ground. The second threshold 'th2' may be a higher threshold than the first threshold 'th1', wherein the engine air intake may be positioned higher than the evaporative emission control system in the vehicle, for example. If the computed water depth [h−h*] is found to be equal to or greater than 'th2', then the controller may conclude that depth of water through which the vehicle is traveling is at or higher than the engine air intake, such that water may enter through the intake into the combustion engine.

In another embodiment, during forward drive of the vehicle in water, the controller may obtain the distance to water (e.g. water being the nearest detectable surface) from the vertically-facing proximity sensor and may compare the proximity sensor's output to one or more distance thresholds. Herein, a first threshold distance may indicate a distance of the proximity sensor to the engine air intake and a second threshold distance may indicate a distance of the proximity sensor to the vent line inlet of the evaporative emissions control system. For example, responsive to the distance to water being greater than the first threshold distance but less than the second threshold distance, the controller may close the canister vent valve. The controller may further shut down the engine (and at least in some examples proceed to propel the vehicle with an electric motor) responsive to the distance being less than the first threshold distance. The second threshold distance may be a greater distance than the first threshold distance, wherein the engine air intake may be positioned higher than the evaporative emission control system relative to the ground.

In yet another embodiment, during forward drive of the vehicle in water, the controller may obtain the proximity sensor's distance to water output (e.g. water being the nearest detectable surface) and may compare the proximity sensor's output to one or more distance thresholds, the distance thresholds herein being different from the previous embodiment. In one example, responsive to the distance to water being less than a first threshold distance and greater than a second threshold distance, the controller may disable the fuel vapor purge. Herein, the first threshold distance may indicate a distance of the proximity sensor to the vent line inlet of the evaporative emissions control system and the second threshold may indicate a distance of the proximity sensor to the engine air intake. The controller may further shut down the engine, responsive to the distance being less than the second threshold. The first threshold may be a higher threshold than the second threshold indicating the engine air intake positioned higher than the evaporative emission control system.

The controller may then specifically control vehicle operations to prepare and protect the vehicle from water inhalation, described in detail in FIG. 4 below.

Figure 4:
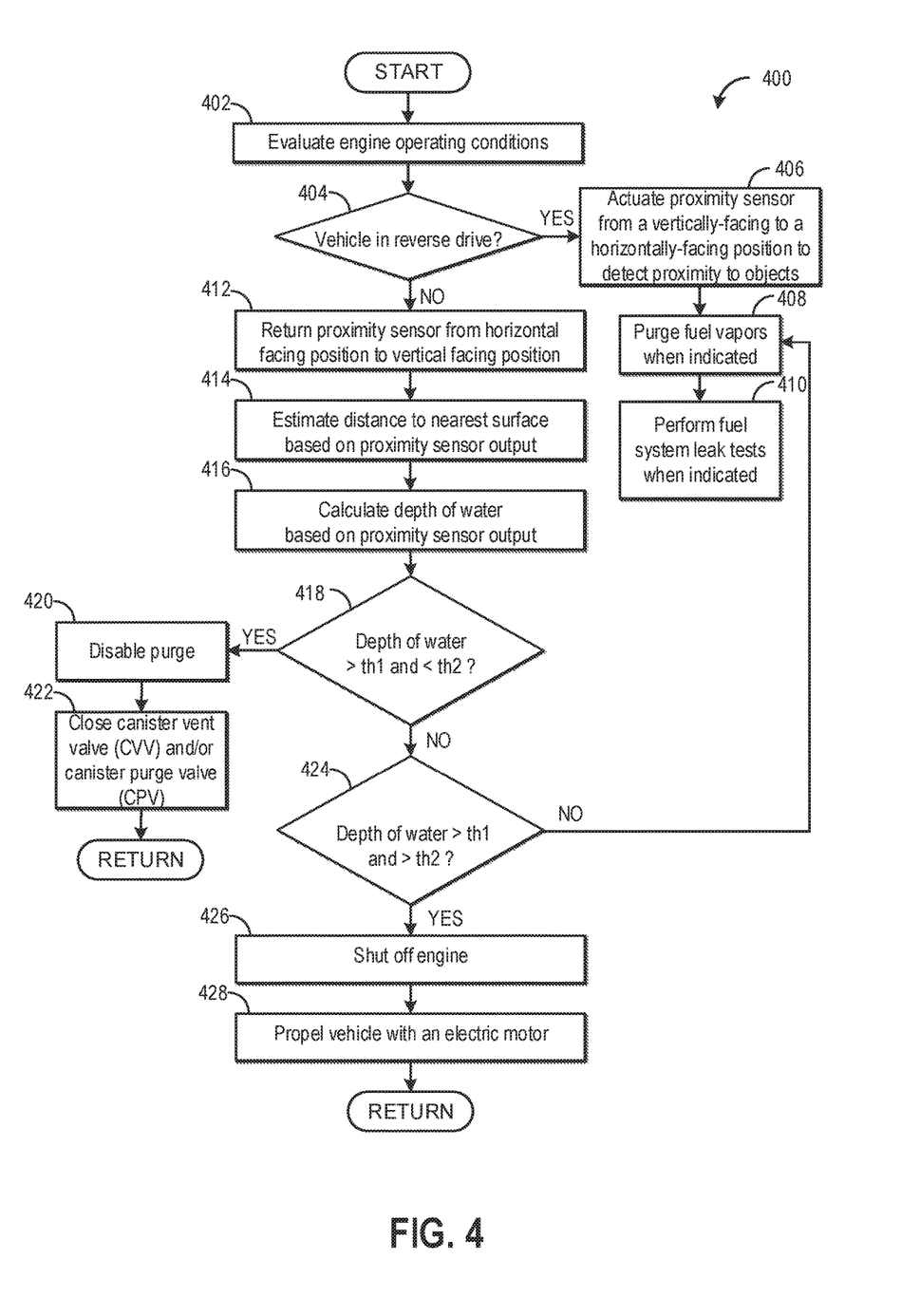
FIG. 4 shows a flowchart illustrating a method for controlling vehicle operations in response to detection of water from the proximity sensor output.
Figure 5:
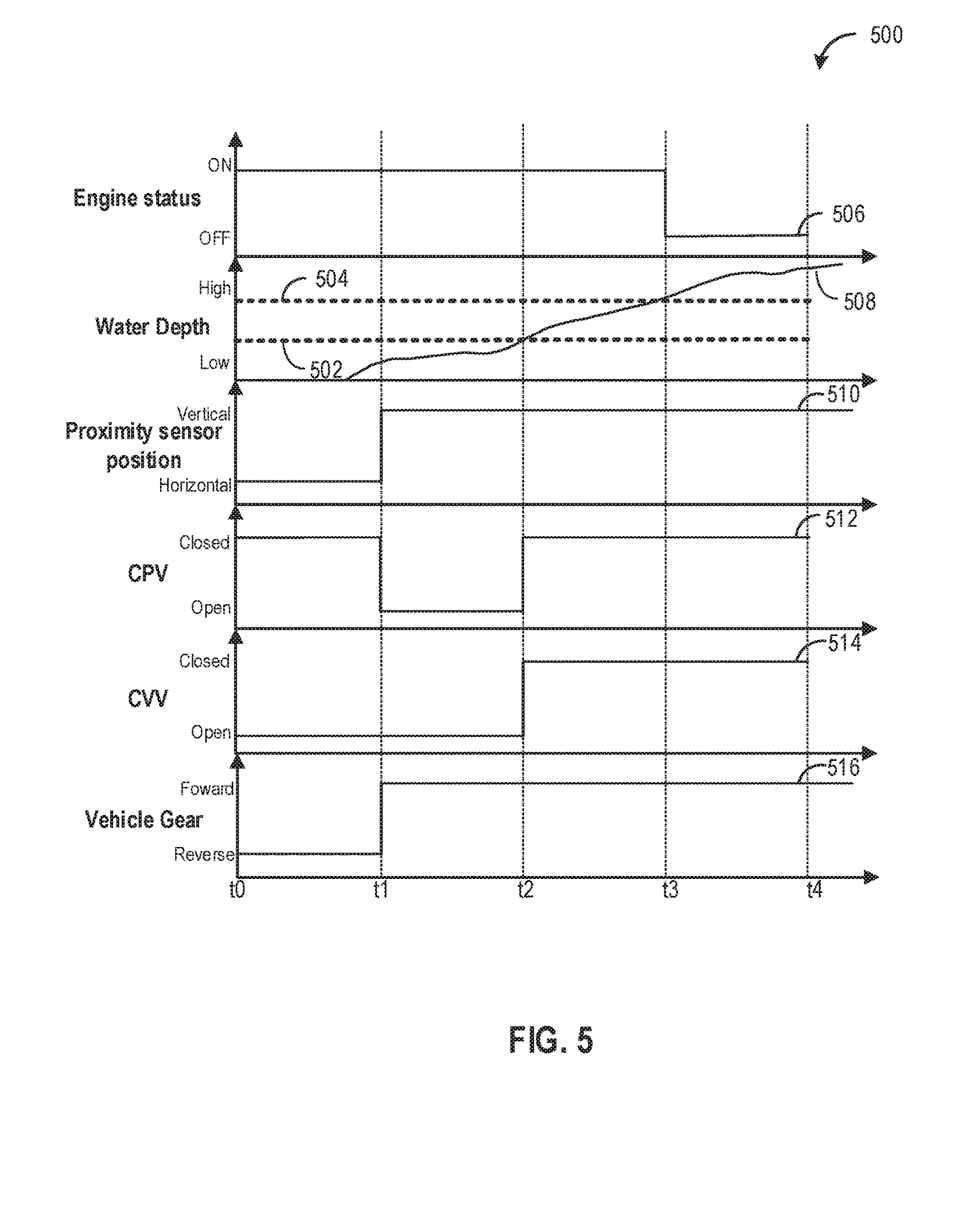
FIG. 5 shows a graph depicting engine operating parameters for a vehicle traveling in water.

FIG. 4 shows a flowchart illustrating a method 400 for controlling vehicle operations in response to detection of water from the proximity sensor output. Instructions for carrying out method 400 included herein may be executed by controller 112 based on instructions stored on a memory of the controller and in conjunction with signals received from sensors of the engine system, such as the sensors described above with reference to FIGS. 1 and 2A and 2B (e.g. proximity sensor 202). The controller may employ engine actuators of the engine system to adjust engine operation (e.g. solenoid 206 coupled to and configured to adjust position of proximity sensor 202), according to the method described below.

At 402, the method includes estimating and/or measuring engine operating conditions. These may include, for example, transmission driving gear (e.g., forward or reverse), engine speed, torque demand, boost level, engine temperature, exhaust temperature, barometric pressure, fuel composition, particulate filter load, etc. Estimating engine operating conditions may optionally include inferring a rain event via a plurality of methods, as described below. At 404, method 400 determines if the vehicle is in reverse drive. A reverse drive of the vehicle may be determined from a selected drive gear of the vehicle or other mechanism. When the answer at 404 is yes (e.g., when the vehicle is in reverse gear) method 400 moves to 406 to actuate the proximity sensor from a vertically-facing position to a horizontally-facing position to detect proximity to objects. For example, the proximity sensor may be a backup sensor or a PDC sensor of the vehicle that when actuated to be horizontally-facing, may determine distance to obstacles. Herein, sensing axis 212 may be oriented parallel to the horizontal reference plane (e.g. ground) when sensor 202 is actuated to a horizontally-facing position. In one example, the proximity sensor may output distance measurements to the controller and the controller in turn may provide an on-board assessment to the driver of the vehicle.

At 408, the vehicle may purge fuel vapors when indicated. In one example, purging of the fuel vapor canister may be indicated when the canister load exceeds a threshold, for example when the amount of stored fuel vapors in the canister is at or near an absorption capacity of the canister. Herein, the controller may enable purging of the fuel vapor canister by opening the canister purge valve and the canister vent valve. Vacuum generated by the intake manifold during engine operation may be used to draw fresh air via the canister vent port and through the fuel vapor canister, thereby purging the stored fuel vapors into the intake manifold to be combusted.

Method 400 may continue to 410 to perform fuel system leak tests when indicated. Leak tests may be indicated under conditions when the vehicle speed is within a pre-determined range, if the leak check routine has not been run on current trip, powertrain load is within a pre-determined range, etc. In one example, the leak detection test may include using vacuum from the internal combustion engine to decrease pressure inside the fuel tank and closing the canister vent valve to atmosphere. The fuel system may be determined to be leak-free when the decreased pressure is consistently maintained for a certain time period. In another example relating to a hybrid electric vehicle, it may be possible that the vehicle may run in an all-electric mode (on battery power) with minimal usage of the associated internal combustion engine. Leak detection in such a vehicle may use energy from the battery to induce a temperature change inside the fuel tank (e.g. heat the fuel). In this example, a first temperature may be measured by a temperature sensor, after which heat may be transferred to the fuel system and a second temperature measured. Integrity of the fuel system may be verified by measuring temperature of the fuel flowing out of the fuel system, and comparing the measurement to a pre-determined value. Alternatively, integrity of the fuel system may be checked by inducing a pressure in the fuel system by pumping air into the fuel tank and sealing the fuel system from atmosphere (e.g. by closing the canister vent valve). If the pressure in the system as measured by a pressure sensor increases at an expected rate, the fuel system is concluded to be sealed while if the pressure rise is lower than that expected for a sealed system, a leak is determined. In some examples, the leak test may be repeated. In this way, determination of the integrity of the fuel system may be made by temperature and pressure measurements and comparing the measurements to pre-determined values. Signaling the presence of a leak may then be performed in a suitable manner, for example by lighting up an indicator at the dashboard of the vehicle. Instructions for one or more methods of leak detection may be stored in the memory of the controller.

Returning back to method 400, at 404 method 400 determines if the vehicle is in reverse drive. When the answer at 404 is no (e.g., when the vehicle is in any gear, other than reverse) method 400 moves to 412 to return the proximity sensor from a horizontally-facing position to a vertically-facing position. When the sensor is vertically-facing, sensing axis 212 may be perpendicularly oriented to the horizontal reference plane, such as the ground. In one example, the controller may return the proximity sensor back to a default vertically-facing position responsive to the vehicle switching out from a reverse driving mode. For example, the controller may send a signal to de-energize the solenoid actuator, thereby de-activating the plunger of the solenoid actuator, to take the force off of the ball joint, thus returning the sensor back to a vertically-facing default position, as depicted in FIG. 2A. In another example, the proximity sensor may be adjusted from a horizontally-facing position to a vertically-facing position, upon detection of a rain event during forward drive of the vehicle (e.g. vehicle not in reverse drive). Detection of a rain event may be based on information obtained from a rain sensor for example. In one example, the rain sensor may be an on-board rain sensor configured to provide an indication of rain event and rain levels to controller 112. Such a sensor may function optically to detect moisture and may be combined with an existing wiper system of the vehicle, e.g. sensor may be mounted on the wiper blades, in one example. In another example, a rain detecting optical sensor may be mounted in contact with the inside of the windshield, such as near a rearview mirror or may be alternatively installed to a bracket in the upper center part of the windshield, integrated with the auto-light sensor, to sense the presence of moisture on the windshield. In other examples, a humidity sensor may also be used. Additionally or alternatively, detection of a rain event may be based on information received from a remote device such as a device of a weather service (e.g. a weather report from a weather service), GPS system, from vehicle to vehicle communication and/or a personal weather station. In one example, a combination of methods may be used to infer a rain event.

Returning back to method 400, at 414, the method may estimate distance to the nearest surface based on the output of the proximity sensor. The proximity sensor in the vertically-facing default position may determine proximity to the ground surface on which the vehicle is traveling. In the event of the vehicle encountering high water, the proximity sensor may estimate a vertical height of the sensor above the water (e.g. sensor height above water level with water being the nearest surface). At 416, method 400 may calculate a depth of water based on the proximity sensor output. As explained prior with reference to FIG. 3, the controller may obtain distance output from the proximity sensor. The controller may compute a depth of water based on the difference in the output of the proximity sensor when the vehicle is traveling on dry ground (h) relative to the output of the proximity sensor when the vehicle is driving in water (h*). The controller may then compare the computed depth of water to the first and second thresholds. Specifically at 418, method 400 may determine if the depth of water is above the first threshold and below the second threshold. As described earlier in FIG. 3, the first water level threshold 'th1' may represent a height on the vehicle, which when exceeded may introduce water into the evaporative emissions control system via the vent line inlet. The second water level threshold 'th2' may represent another height on the vehicle, which when surpassed may allow water into the engine air intake. In one example, the first and second thresholds may be absolute non-zero positive value thresholds, stored in the memory of the controller, such as controller 112. If the depth of water is above the first threshold but below the second threshold (e.g. YES at 418), method 400 may move to 420 to disable purge. Purge operations may be disabled by closing the canister purge valve and/or the canister vent valve, at 422. Closure of the canister vent valve may be a precaution that may prevent the entry of water into the fuel vapor canister under conditions where water may find its way in via the vent line inlet. Thus, degradation of the canister may be avoided. Closure of the canister purge valve may be an additional precaution, wherein the controller may ensure that any water that may have been admitted into the fuel vapor emission system may be blocked from getting sucked into the engine intake manifold and into the combustion engine. In this way, vehicle operations may be suitably controlled to inhibit the entry of water into the evaporative emission control system. Further, when the depth of the water is greater than the first threshold, any fuel system leak detection tests that are currently executing or scheduled to be executed may be paused and/or delayed. For example, the closure of the canister vent valve and/or canister purge valve may disrupt the leak detection and/or the presence of the water near or around the fuel system components may confound test results, making the results unreliable. Method 400 then returns.

Returning back to 418, method 400 may determine if the depth of water is above the first threshold but below the second threshold. If depth of water is above the first threshold but not above the second threshold (e.g. NO at 418), method 400 proceeds to 424 to determine if the depth of water is above the first threshold and above the second threshold. In one example, the depth of water through which the vehicle is traveling may be gradually rising, such as the vehicle driving through a flooded area. If the depth of water is determined to be not greater than the first and the second thresholds (e.g. NO at 424), method 400 concludes that the water level through which the vehicle is traveling may not be high enough to enter the engine and/or fuel system via either the engine air intake or via the evaporative emissions control system. Thus, method 400 proceeds to 408 to purge fuel vapors when indicated and then to 410 to perform fuel system leak tests when indicated. However, if the depth of water is determined to be higher than the first threshold and the second threshold (e.g. YES at 424), method 400 moves to 426 to shut off the engine. An estimated depth of water higher than the second threshold (e.g. water levels are higher than both the first and second thresholds), may permit water to be introduced into the engine air intake system. Therefore, as a precaution, the controller may intentionally shut-off the internal combustion engine to prevent hydrolock and degradation to engine components. An internal combustion engine may be shut down in one example by a fuel cut-off, in another example by engine throttle control or a combination of such methods. In one example, the threshold th1 may represent a height on the vehicle at which the evaporative emission control system vent line inlet is mounted or the first threshold th1 may represent a height of the vehicle that is below the evaporative emission control system vent line inlet. For example, when the first threshold th1 is a vehicle height below the evaporative emission control system vent line inlet, the first threshold th1 may be set at 10% below of the height of the vent line inlet (e.g., the threshold may represent 90% of the height of the vent line inlet relative to ground). Similarly, the threshold th2 may represent a height on the vehicle at which the engine air intake is mounted or the second threshold th2 may represent a height on the vehicle that below the engine air intake. For example, when the second threshold th2 is a vehicle height below the engine air intake, the second threshold th2 may be set at 10% below of the height of the engine air intake (e.g., the second threshold may represent 90% of the height of the engine air intake relative to ground). By comparing water depth to thresholds that are representative of water sensitive vehicle components or are positioned below the components, sufficient time may be allowed for vehicle control operations to be executed. In this way, vehicle operations may be controlled to inhibit the entry of water into the combustion engine. Method 400 may proceed to 428 to optionally propel vehicle with an electric motor (or maintain propulsion by the electric motor, if the vehicle was already in electric mode). In another embodiment, the controller may compare the proximity sensor's distance output to distance thresholds including a first threshold distance indicating a distance of the proximity sensor to the engine air intake. The controller may further shut down the engine (and propel the vehicle with an electric motor in some examples) responsive to the measured distance being less than the first threshold. As mentioned before, the vehicle may be a hybrid electric vehicle comprising an electric motor and an internal combustion engine. A precautionary shut down of the internal combustion engine by the controller may shift vehicle operations to the electric operating mode wherein the electric motor fed by the battery may be used for vehicle propulsion. In some examples, when the vehicle is shifted to or maintained in the electric mode responsive to the depth of water being greater than the second threshold, vehicle operating parameters may be adjusted to prolong the duration the vehicle can be propelled in the electric mode. For example, vehicle torque may be reduced by lowering a vehicle torque limit to prolong the range that the vehicle may be propelled by the electric motor. In another example, selected vehicle operations may be disabled to prolong battery life and/or prevent water inhalation into the vehicle heating and cooling system, such as shutting off an air conditioning condenser, temporarily disabling cabin heating or cooling, closing front end grille shutters, etc. Method 400 then returns.

Thus, by performing the control routine of FIG. 4 to make a determination of water depth which the vehicle may encounter, the controller may pre-emptively prepare the vehicle by executing one or more vehicle control strategies and may protect water sensitive vehicle components from degradation. Optionally, the controller may also alert the vehicle operator and further provide recommendations to the operator to execute the vehicle control operations discussed in FIG. 4.

Turning now to FIG. 5, a graph 500 depicting engine operating parameters for a vehicle traveling in water is shown. The horizontal (x-axis) denotes time and the vertical axes show respective values for engine parameters operating at times t0-t4. The first plot from the top shows operating status of the internal combustion engine of the vehicle, wherein line 506 depicts an engine that may be combusting (on) or shut down (off). The second plot shows water depth that may be calculated based on distance measurements obtained from the proximity sensor of the vehicle when the vehicle may encounter water. In this plot, line 508 depicts water level or water depth over time and dotted lines 502 and 504 show the first and second thresholds (th1 and th2) representing the height on the vehicle corresponding to the vent line inlet coupled to the evaporative emission control system and the engine air intake, respectively. A level of water measured that exceeds the first and/or threshold may result in vehicle operations being controlled to prevent the entry of water into the above mentioned vehicle systems. The third plot from top shows the position of the proximity sensor such as sensor 202 on the vehicle which may alternate between vertically-facing and horizontally-facing responsive to a selected transmission gear of a vehicle, in one example. Line 510 in the third plot indicates the position of the proximity sensor as vertical or horizontal. The fourth plot from top includes line 512 which shows the state of the canister purge valve, e.g., CPV 161, which may alternate between an open vs. closed state. The CPV may be open to allow fuel vapors to be purged into the combustion engine and may be closed when the load on the fuel vapor canister is below a threshold load. Additionally, the CPV may be closed when there is a risk of water inhalation, so as to prevent water from being sucked into the combustion engine. The fifth plot from top includes line 514 which shows the state of the canister vent valve, e.g., CVV 129 that may operate similar to the CPV in an open vs. closed state. The CVV coupled to the vent line of the evaporative emission control system may be open during fuel vapor purge to allow the vapors adsorbed by the fuel vapor canister to be purged via fresh air taken in via the valve. The CVV may be closed when there is a possibility of high water being introduced into the emission system via the vent line inlet, thus blocking the entry of water into the fuel vapor canister. The sixth plot, from the top includes line 516 which shows vehicle gear positions, wherein the transmission may either be in forward drive or reverse drive, although it is to be understood that other vehicle drive gears are possible.

During time period t0-t1, the vehicle with the combustion engine on (e.g. line 506 in the first plot) may be driving in reverse gear, as seen by line 516 in the sixth plot. The vehicle during t0-t1 may be driving on ground surface with no detectable water as shown by line 508. As the vehicle is in reverse gear, the proximity sensor may be actuated by the controller to assume a horizontally-facing position as shown by line 510 in the third plot. When the depth of water (e.g. no water detected during t0-t1) is below the first and second diagnostic thresholds, the canister vent valve may be open to intake fresh air via the vent line inlet and perform purge of the fuel vapors in the carbon canister in one example, as shown by line 514 in the fifth plot. During this time period, the canister purge valve may be closed as shown by line 512 in the fourth plot due to the fuel vapor load in the fuel vapor canister being less than a threshold load.

At time t1, the vehicle may shift gears, for example shift from a reverse to a forward gear (line 516) with the combustion engine running (line 506). In response, the controller may automatically actuate the proximity sensor to assume its default position and face vertically, as shown by line 510, to detect a distance to ground as explained with respect to FIG. 2A before. During t1-t2, the vertically-facing proximity sensor may estimate the distance to the nearest surface. In one example, the nearest surface may be the ground on which the vehicle is driving. In another example, the vehicle may encounter driving in water and thus the proximity sensor may measure distance to water. The controller of the vehicle may obtain distance outputs from the proximity sensor, in real time and may calculate a depth of water. For example, during t1-t2 the calculated depth of water, as shown by line 508, may be below the first and second thresholds. As a result, the CVV may be in an open position, as shown by line 514, to continue allowing fresh air into the vent line and into the fuel vapor canister, for fuel vapor purging and/or fuel system leak checks when indicated. Further, engine operations may lead to fuel vapor load of the fuel vapor canister surpassing the threshold load. As a result, the CPV may be actuated from a previously closed (t0-t1) to an open position (t1-t2) as shown by line 512.

At time t2, the depth of water through which the vehicle may be traveling may exceed the first threshold (th1) but not exceed the second threshold (th2), depicted by line 508 being higher than dotted line 502 but not higher than dotted line 504. At this time, the vehicle may be traveling forward (line 516) with the engine on (line 506) and the proximity sensor facing vertically to estimate distance to water. In one example, threshold th1 may be based on a height on the vehicle at which the evaporative emission control system vent line inlet is mounted, but may be a height measured below the evaporative emission control system vent line inlet so that sufficient time may be allowed to protect and prepare the vehicle in the event of introduced water. The depth of water above the first threshold during t2-t3 may present a possibility of water being introduced into the evaporative emission control system via the vent line inlet and further via the CVV and into the canister (See FIG. 1). As a result, during this time period, the CVV may be closed as shown by line 514, to inhibit water from entering into the evaporative emission control system and damaging the fuel vapor canister. As an additional precautionary measure, the CPV may also be closed as shown by line 512, to prevent any water undesirably introduced into the emission control system from getting into the internal combustion engine via the CPV.

In one example, the vehicle may continue to drive forward through water of increasing depth. At time t3, the depth of water through which the vehicle may be traveling may exceed the first and second thresholds (th1 and th2), depicted by line 508 being higher than dotted lines 502 and 504. At this time, the vehicle may be traveling forward (line 516) with the proximity sensor facing vertically to estimate distance to water. In one example, threshold th2 may be based on a vehicle height at which the engine air intake is mounted, but may be a height measured below the engine air intake such that adequate time may be allowed to protect and prepare the vehicle in the event of introduced water. The depth of water above the first and second thresholds during t3-t4 may possibly introduce water into the evaporative emission control system and the engine air intake. As a result, upon determination of water depth exceeding the second threshold, during time period t3-t4, CPV and CVV may be maintained closed as shown by lines 512 and 514, to block the entry of water into the evaporative emissions control system, and further, the internal combustion engine of the vehicle may be shut down (turned off) as shown by line 506, to avoid the entry of water into the engine air intake.

In this way, in vehicle systems employing a proximity sensor such an ultrasonic PDC sensor, repurposing the proximity sensor by adjusting its position from horizontally-facing to vertically-facing and vice versa may not only allow for the determination of obstacles in the vehicle's path but may further allow for the determination of a water depth through which the vehicle is traveling. In addition, vehicle components that may be at risk from introduced water may be suitably disabled upon detection of water levels exceeding pre-determined thresholds. For example, by suspending purge operation when a vehicle is in high water as determined by a first threshold and by further shutting off the engine when the water level is higher as determined by a second threshold, the risk of water inhalation into the evaporative emission control system and the engine air intake may be mitigated.

The technical effect of monitoring water levels in real time with a proximity sensor is that vehicle operations may be pre-emptively controlled to prevent water from being introduced into the evaporative emission control system and the engine intake system. In this way, the vehicle components at risk may be prepared ahead of time and protected from water damage and maintenance costs may be avoided.

FIGS. 2A and 2B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

A method includes adjusting a valve in a fuel system of a vehicle responsive to a level of water through which the vehicle is passing. In a first example of the method, adjusting the valve comprises adjusting a position of a fuel vapor canister purge valve positioned intermediate a fuel vapor canister and an engine. A second example of the method optionally includes the first example and further includes wherein adjusting the valve comprises adjusting a position of a fuel vapor canister vent valve positioned intermediate a fuel vapor canister and atmosphere. A third example of the method optionally includes one or more or both of the first and second examples, and further comprises measuring the level of water during forward driving of the vehicle based on output from one or more proximity sensors positioned on the vehicle. A fourth example of the method optionally includes one or more or each of the first through third examples, and further includes measuring a distance between the vehicle and one or more objects in proximity to the vehicle during reverse driving of the vehicle based on output from the one or more proximity sensors. A fifth example of the method optionally includes one or more or each of the first through fourth examples, and further includes wherein adjusting the valve responsive to the level of water comprises closing the valve responsive to the level of water exceeding a first threshold level. A sixth example of the method optionally includes one or more or each of the first through fifth examples, and further includes shutting off an engine of the vehicle responsive to the level of water exceeding a second threshold level, greater than the first threshold level. A seventh example of the method optionally includes one or more or each of the first through sixth examples, and further comprises responsive to shutting off the engine, propelling the vehicle with an electric motor. An eighth example of the method optionally includes one or more or each of the first through seventh examples, and further includes wherein the valve is a canister vent valve fluidically coupling a fuel vapor canister to atmosphere, and further comprising, when the level of water is below the first threshold level, opening the canister vent valve and responsive to a load on the fuel vapor canister reaching a threshold load, opening a canister purge valve to route fresh air through the canister vent valve and the fuel vapor canister and route a fresh air-fuel vapor mix to the engine through the canister purge valve. A ninth example of the method optionally includes one or more or each of the first through eighth examples, and further includes delaying a fuel system leak test until the level of water drops below a threshold level.

In the above examples, adjusting the valve in the fuel system of the vehicle responsive to the level of water through which the vehicle is passing may include measuring a level of water with a proximity sensor and determining that the vehicle is passing through a level of water that is greater than a first threshold level, where the first threshold level represents a height of a fuel system fresh air inlet. In response to determining that the vehicle is passing through water, where the level of the water is greater than the first threshold, the valve in the fuel system is adjusted. Examples may include measuring the level of water with the proximity sensor and determining, from the measuring, that the vehicle is passing through a level of water that is greater than a second threshold level, where the second threshold level represents a height of an engine fresh air intake. In response to determining that the vehicle is passing through water, where the level of the water is greater than the second threshold, the engine of the vehicle may be shut down.

In an example, the vehicle may operate in a first mode, where the first mode includes passing through the water that has the level above the first threshold. The first mode also includes adjusting the valve in the fuel system. In an example, the vehicle may operate in a second mode, where the second mode includes passing through the water that has the level above the second threshold. Subsequent to operating in the second mode, the engine may be shut down.

A method for a vehicle comprises responsive to detection of a rain event and when the vehicle is in forward drive, actuating an actuator of a proximity sensor to tilt the proximity sensor from a horizontally-facing position to a vertically-facing position, estimating a distance to a surface of a ground on which the vehicle sits based on output from the proximity sensor, responsive to the distance being less than a first threshold and greater than a second threshold, disabling fuel vapor purge and responsive to the distance being less than the second threshold, shutting off an engine of the vehicle. In a first example of the method, when the proximity sensor is in the vertically-facing position, the proximity sensor is angled toward the ground on which the vehicle sits, and the method further comprises when the vehicle is in reverse drive, actuating the actuator to move the proximity sensor back to the horizontally-facing position and estimating a distance to an object proximate the vehicle based on the output from the proximity sensor. A second example of the method optionally includes the first example and further includes wherein disabling fuel vapor purge comprises one or more of closing a canister vent valve and closing a canister purge valve. A third example of the method optionally includes one or more or both of the first and second examples, and further includes wherein detecting the rain event comprises detecting the rain event based on one or more of information received from a remote device and output from an on-board rain sensor.

In the above examples, the vehicle may operate in a first mode that includes operation in forward drive. The first mode may also include actuating the actuator of the proximity sensor to tilt the proximity sensor from the horizontally-facing position to the vertically-facing position. In the first mode, the distance to the surface of a ground on which the vehicle sits is estimated based on output from the proximity sensor. In the first mode, the distance is less than the first threshold and greater than the second threshold. In the first mode, fuel vapor purge is disabled. The vehicle may operate in a second mode that includes operation in forward drive. The second mode may also include actuating the actuator of the proximity sensor to tilt the proximity sensor from the horizontally-facing position to the vertically-facing position. In the second mode, the distance to the surface of a ground on which the vehicle sits is estimated based on output from the proximity sensor. In the second mode, the distance is less than the second threshold. Subsequent to operation in the second mode, the engine of the vehicle is shut off.

A system for a vehicle comprises an engine, an electric motor, a fuel system including a fuel vapor canister coupled to a fuel tank and to the engine; a vent valve fluidically coupling the fuel vapor canister to atmosphere; a proximity sensor positioned on a body of the vehicle; and a controller storing instructions executable to, when the proximity sensor is in a first position, measure a distance between the proximity sensor and a surface detectable by the proximity sensor; responsive to the distance being greater than a first threshold distance but less than a second threshold distance, close the canister vent valve; and responsive to the distance being less than the first threshold distance, shut down the engine and propel the vehicle with the electric motor. In a first example of the system, the instructions are executable to, when the proximity sensor is in a second position, notify a vehicle operator that an object is positioned within a threshold range of distances behind the vehicle based on output from the proximity sensor. A second example of the system optionally includes the first example and further includes a solenoid actuator coupled to the proximity sensor and configured to move the proximity sensor from the first position to the second position, the first position being a vertically-facing position where a sensing axis of the proximity sensor is perpendicular to a ground on which the vehicle sits, the second position being a horizontally-facing position where the sensing axis of the proximity sensor is parallel to the ground on which the vehicle sits. A third example of the system optionally includes one or more or both of the first and second examples, and further includes wherein the instructions are executable to energize the solenoid actuator to move the proximity sensor to the second position responsive to the vehicle being operated in a reverse driving gear. A fourth example of the system optionally includes one or more or each of the first through third examples, and further includes wherein the instructions are executable to lower a vehicle torque limit responsive to the distance being less than the first threshold distance. A fifth example of the system optionally includes one or more or each of the first through fourth examples, and further includes wherein the proximity sensor comprises an ultrasonic sensor positioned on a rear bumper of the vehicle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
adjusting a valve in a conduit of a fuel system of a vehicle responsive to a level of water through which the vehicle is passing, the conduit coupled to a fuel vapor canister of the fuel system.

2. The method of claim 1, wherein adjusting the valve comprises adjusting a position of a fuel vapor canister vent valve positioned intermediate the fuel vapor canister and atmosphere.

3. The method of claim 1, further comprising measuring the level of water during forward driving of the vehicle based on output from one or more proximity sensors positioned on the vehicle.

4. The method of claim 3, further comprising measuring a distance between the vehicle and one or more objects in proximity to the vehicle during reverse driving of the vehicle based on output from the one or more proximity sensors.

5. The method of claim 1, wherein adjusting the valve responsive to the level of water comprises closing the valve responsive to the level of water exceeding a first threshold level.

6. The method of claim 5, further comprising shutting off an engine of the vehicle responsive to the level of water exceeding a second threshold level, greater than the first threshold level.

7. The method of claim 6, further comprising responsive to shutting off the engine, propelling the vehicle with an electric motor.

8. The method of claim 6, wherein the valve is a canister vent valve fluidically coupling the fuel vapor canister to atmosphere, and further comprising, when the level of water is below the first threshold level:
opening the canister vent valve; and
responsive to a load on the fuel vapor canister reaching a threshold load, opening a canister purge valve to route fresh air through the canister vent valve and the fuel vapor canister and route a fresh air-fuel vapor mix to the engine through the canister purge valve.

9. The method of claim 1, further comprising delaying a fuel system leak test until the level of water drops below a threshold level.

10. A method, comprising:
adjusting a valve in a fuel system of a vehicle responsive to a level of water through which the vehicle is passing, wherein adjusting the valve comprises adjusting a position of a fuel vapor canister purge valve positioned intermediate a fuel vapor canister and an engine.

11. A method for a vehicle, comprising:
responsive to detection of a rain event and when the vehicle is in forward drive, actuating an actuator of a proximity sensor to tilt the proximity sensor from a horizontally-facing position to a vertically-facing position;
estimating a distance to a surface of a ground on which the vehicle sits based on output from the proximity sensor;
responsive to the distance being less than a first threshold and greater than a second threshold, disabling fuel vapor purge; and
responsive to the distance being less than the second threshold, shutting off an engine of the vehicle.

12. The method of claim 11, wherein when the proximity sensor is in the vertically-facing position, the proximity sensor is angled toward the ground on which the vehicle sits, and further comprising when the vehicle is in reverse drive, actuating the actuator to move the proximity sensor back to the horizontally-facing position and estimating a distance to an object proximate the vehicle based on the output from the proximity sensor.

13. The method of claim 11, wherein disabling fuel vapor purge comprises one or more of closing a canister vent valve and closing a canister purge valve.

14. The method of claim 11, wherein detecting the rain event comprises detecting the rain event based on one or more of information received from a remote device and output from an on-board rain sensor.

15. A system for a vehicle, comprising:
an engine;
an electric motor;
a fuel system including a fuel vapor canister coupled to a fuel tank and to the engine;
a vent valve fluidically coupling the fuel vapor canister to atmosphere;
a proximity sensor positioned on a body of the vehicle; and
a controller storing instructions executable to:
when the proximity sensor is in a first position, measure a distance between the proximity sensor and a surface detectable by the proximity sensor;
responsive to the distance being greater than a first threshold distance but less than a second threshold distance, close the vent valve; and
responsive to the distance being less than the first threshold distance, shut down the engine and propel the vehicle with the electric motor.

16. The system of claim 15, wherein the instructions are executable to, when the proximity sensor is in a second position, notify a vehicle operator that an object is positioned within a threshold range of distances behind the vehicle based on output from the proximity sensor.

17. The system of claim 16, further comprising a solenoid actuator coupled to the proximity sensor and configured to move the proximity sensor from the first position to the second position, the first position being a vertically-facing position where a sensing axis of the proximity sensor is perpendicular to a ground on which the vehicle sits, the second position being a horizontally-facing position where the sensing axis of the proximity sensor is parallel to the ground on which the vehicle sits.

18. The system of claim 17, wherein the instructions are executable to energize the solenoid actuator to move the proximity sensor to the second position responsive to the vehicle being operated in a reverse driving gear.

19. The system of claim 15, wherein the instructions are executable to lower a vehicle torque limit responsive to the distance being less than the first threshold distance.

20. The system of claim 15, wherein the proximity sensor comprises an ultrasonic sensor positioned on a rear bumper of the vehicle.

* * * * *